United States Patent
Remmelmann

(10) Patent No.: US 11,214,939 B2
(45) Date of Patent: Jan. 4, 2022

(54) METHOD FOR CONTROLLING A LOADING TOOL

(71) Applicant: DEERE & COMPANY, Moline, IL (US)

(72) Inventor: Andreas Remmelmann, Karlstein (DE)

(73) Assignee: DEERE & COMPANY, Moline, IL (US)

( * ) Notice: Subject to any disclaimer, the term of this patent is extended or adjusted under 35 U.S.C. 154(b) by 217 days.

(21) Appl. No.: 16/575,065

(22) Filed: Sep. 18, 2019

(65) Prior Publication Data

US 2020/0109538 A1     Apr. 9, 2020

(30) Foreign Application Priority Data

Oct. 4, 2018  (DE) .......................... 102018217029.0

(51) Int. Cl.
   *E02F 9/20*       (2006.01)
(52) U.S. Cl.
   CPC ............ *E02F 9/2025* (2013.01); *E02F 9/205* (2013.01); *E02F 9/2062* (2013.01)
(58) Field of Classification Search
   CPC ...... A01F 25/2036; E02F 3/404; E02F 3/422; E02F 3/434; E02F 9/2025; E02F 9/205; E02F 9/2062; E02F 9/262
   See application file for complete search history.

(56) References Cited

U.S. PATENT DOCUMENTS

| | | | | |
|---|---|---|---|---|
| 4,809,794 A | * | 3/1989 | Blair | E02F 3/308 177/139 |
| 4,995,468 A | * | 2/1991 | Fukuda | G01G 19/10 177/139 |
| 5,105,896 A | * | 4/1992 | Kyrtsos | E02F 9/264 177/139 |
| 5,220,968 A | * | 6/1993 | Weber | G01G 19/08 177/139 |
| 6,518,519 B1 | * | 2/2003 | Crane, III | E02F 9/264 177/136 |
| 7,912,612 B2 | * | 3/2011 | Janardhan | B25J 9/1638 701/50 |
| 8,428,832 B2 | * | 4/2013 | Marathe | E02F 9/264 701/50 |

(Continued)

FOREIGN PATENT DOCUMENTS

| | | |
|---|---|---|
| EP | 1452087 A2 | 9/2004 |
| EP | 2838355 A1 | 2/2015 |

(Continued)

OTHER PUBLICATIONS

European Search Repod issued in counterpart European Patent Application No. 19199715.4 dated Mar. 4, 2020 (7 pages).

*Primary Examiner* — Tyler J Lee

(57) ABSTRACT

A method for controlling a loading tool includes positioning the loading tool on a lifting device of a machine, receiving a payload by the loading tool from a payload stock during an operating mode, and determining a mass of the payload during the operating mode. The method also includes providing calibration data representative of a ratio between a volume of the payload and a mass of the payload, detecting a volume of the payload during the operating mode, and determining the mass of the payload as a function of the detecting step and the calibration data.

20 Claims, 1 Drawing Sheet

(56) References Cited

U.S. PATENT DOCUMENTS

| | | | |
|---|---|---|---|
| 8,515,627 B2* | 8/2013 | Marathe | E02F 3/431 |
| | | | 701/50 |
| 8,838,331 B2* | 9/2014 | Jensen | G01N 9/36 |
| | | | 701/34.4 |
| 9,091,586 B2* | 7/2015 | Hague | G01G 19/10 |
| 9,200,432 B1* | 12/2015 | Shatters | E02F 9/2264 |
| 9,938,692 B2 | 4/2018 | Shatters et al. | |
| 10,234,368 B2* | 3/2019 | Cherney | B60P 1/00 |
| 2008/0169131 A1* | 7/2008 | Takeda | G01G 19/083 |
| | | | 177/136 |
| 2009/0177337 A1* | 7/2009 | Yuet | G05D 1/0044 |
| | | | 701/2 |
| 2013/0346127 A1* | 12/2013 | Jensen | G06Q 10/06 |
| | | | 705/7.12 |
| 2014/0060939 A1 | 3/2014 | Eppert | |
| 2014/0088822 A1* | 3/2014 | Jensen | G01N 9/36 |
| | | | 701/34.4 |
| 2014/0167971 A1* | 6/2014 | Stanley | G01G 19/083 |
| | | | 340/666 |
| 2015/0104273 A1 | 4/2015 | Van Kuilenburg et al. | |
| 2015/0354177 A1* | 12/2015 | Shatters | G01G 19/10 |
| | | | 414/21 |
| 2016/0198677 A1 | 7/2016 | Van Den Berg et al. | |
| 2016/0223387 A1* | 8/2016 | Talmaki | G01G 19/083 |
| 2018/0174291 A1* | 6/2018 | Asada | G06T 7/97 |
| 2020/0087893 A1* | 3/2020 | Hageman | E02F 3/32 |

FOREIGN PATENT DOCUMENTS

| | | |
|---|---|---|
| NL | 2001458 C2 | 10/2009 |
| WO | 2013157931 A1 | 10/2013 |
| WO | 2016159839 A1 | 10/2016 |

* cited by examiner

METHOD FOR CONTROLLING A LOADING TOOL

RELATED APPLICATIONS

This application claims priority to German Patent Application Ser. No. 102018217029.0, filed Oct. 4, 2018, the disclosure of which is hereby incorporated by reference in its entirety.

FIELD OF THE DISCLOSURE

The present disclosure relates to a method for controlling a loading tool.

BACKGROUND

A conventional method for controlling a loading tool is described in U.S. Pat. No. 9,938,692. There, movements of a lifting cylinder and a lifting arm of a lifting device are controlled in order to lift and transport a loading tool arranged thereon and filled with a payload in the form of a loading shovel. Here, the weight of the transported payload is determined as a function of pressure values of the lifting cylinders, a lifting arm angle and other kinematic properties.

There is a need to determine the mass of the payload by means of a simple method during the operating mode of the loading tool.

SUMMARY

In the present disclosure, a loading tool, in particular its movements during its operating mode, is controlled. The loading tool is arranged on a movable lifting device for lifting and lowering the loading tool, while the lifting device itself is mounted on a machine. During its operating mode, the loading tool receives a payload. In particular, the payload is transported to a different location and unloaded there. In order to support the operating mode of the loading tool and the machine, a mass of the payload is determined. This determination of the mass of the payload can be carried out prior to or after it being received by the loading tool.

Calibration data which represent a ratio of a volume of the payload to a mass of the payload are provided for the determination of the mass of the payload. During the operating mode of the loading tool, a volume of a payload, in particular before and after it being received by the loading tool, is detected. The mass of this payload can then be determined by means of simple methods on the basis of the calibration data and the volume which has already been detected.

The determined mass can be combined as information with further functionalities of known weighing systems for loading tools. The determined mass can be processed as information for control of the operating mode by an electronic control unit so that the operator of the machine has at his or her disposal an assistance function which relieves the strain on him or her. For example, the user or operator of the machine can then dispense with an estimation, which is among other things prone to errors, of the mass of the relevant payload. This relates in particular to the case of the intended receiving of a payload by the loading tool and also the case of intended unloading or tipping out of a payload transported by the loading tool at an unloading point.

The calibration data can be provided, e.g., as a diagram or characteristic curve. The calibration data can be generated in a calibration process prior to the operating mode of the loading tool and stored, for example, in a storage unit or a control unit for control of the method. The calibration data which are specific to the respective payload can thus be accessed at any time during the operating mode.

The calibration data contains in particular a specific density of the respective payload. The corresponding masses can be derived by means of a simple method from this in the case of determined volumes. Different density values as a function of height for a payload stock are provided as calibration data if the material of the payload stock has a density gradient starting from its ground level along the height direction. This density gradient or also other features of the payload stock can be derived, for example, by means of a perpendicular cutting surface of the payload stock.

The machine is formed in particular as a utility vehicle, e.g., an agricultural vehicle. Tow trucks, tractors, construction machines, wheel loaders, diggers, excavators are possible as utility vehicles. Depending on the type or the functionality of the respective machine, the lifting device can have, between the machine and the loading tool, a single, inherently rigid cantilever part or alternatively have several cantilever parts which are movably connected to one another.

The loading tool can be any desired container for receiving a payload. The loading tool is fixedly or movably connected in a suitable manner on the lifting device. For example, the loading tool is arranged in an articulated manner as a shovel on the lifting device.

The payload can be any desired bulk material and have various aggregate states. For example, the payload is a liquid, seeds, crop, animal food, soil, sand, or aggregate such as crushed rock, gravel and the like.

The detection of the volume of the payload is performed by means of suitable, optical sensor means. For example, at least one camera or at least one distance sensor is arranged on the loading tool. The sensor means or mechanism can also alternatively or additionally be arranged on the lifting device or a support structure of the machine.

The volume of a payload is already detected before it is received by the loading tool. As a result of this, it can already be precisely estimated before the payload is received on a payload stock (e.g., a silage stock) or another storage site of this payload which mass the loading tool would receive in the case of the current loading process. This information supports an efficient and economical operating mode since it can influence control of the loading tool in such a manner that neither too small nor too large a mass is received by the loading tool during a single loading process. The method thus offers an advantageous assistance function during loading work of the machine. The strain on the operator of the machine can be significantly relieved during the operating mode.

Automatic control of the operating mode of the loading tool and the machine and consequently also an efficient working procedure of the loading work are advantageously supported if the determined mass is compared with a predetermined target mass (e.g., from 20 kg to 700 kg). As a function of the comparative result, corresponding control signals can then be generated in order to automatically control an operating function of the machine. The target mass for the currently considered payload can be stored in a control unit of the machine.

In the case of one embodiment, the operation of the loading tool is controlled as an operating function of the machine. The loading tool is advantageously controlled so that, as a function of the above-mentioned comparative result, it automatically receives a payload or is released for a receiving of the payload to be triggered by the user (e.g., by means of suitable signaling to the user or driver). As a result of this, it is achieved by means of a simple method that the loading tool—possibly taking into account a defined tolerance mass—always only receives the desired target mass in the case of an individual loading process. In other words, a loading process is started automatically in the event of detection of a desired mass of the payload, or the loading process can be started by the user only in the event of detection of a desired mass of the payload. The strain on the user or driver of the machine is additionally reduced as a result of this.

This control of the loading tool prevents, by means of a simple method, the loading tool undesirably receiving too small or too large a quantity of a payload in the case of an individual loading process. This control can advantageously be used, for example, in the case of a food or silage stock in order, or an individual loading process with the loading tool to remove the required quantity of animal food as the payload and supply it to another location (e.g., mixing vehicle or mixing container for animal food) as precisely as possible there. As a result of this, excess animal food being tipped back into the food or silage stock and being exposed to an oxidation process which is disadvantageous for food quality is avoided.

In the case of the application of the control method to a food or silage stock, the loading tool is formed as what is known as a grapple bucket with a bucket shutter which automatically drops down during the loading process (automatically or triggered by the user) and separates the desired mass of the payload from the food or silage stock.

A propulsion (e.g., an internal combustion engine with drivetrain or an electric motor) is stopped or interrupted as a function of the above-mentioned comparative result. As a result of this, the operator of the machine is provided with a further assistance function in that he or she is automatically prevented, for example, from driving yet further into a payload stock (e.g., animal food) and as a result receiving an excessive mass of the payload during the current loading process. This automatic control can furthermore be combined with a function, according to which a loading process of the loading tool can only be started after the stopped or interrupted propulsion (automatically or individually by the user).

During the operating mode, the loading tool can perform the respective loading process at different height positions. The height position is dependent in particular on the current structure of the payload stock or the residual quantity of the payload stock which is still present. The height position can be, for example, relative to a level of the ground or to a base level of the payload stock. Due to an often present density gradient of the payload stock, it is advantageous to generate and provide in each case calibration data for several, i.e., different height positions. As a function of a detected height position of the loading tool, the calibration data assigned to this height position can then be provided automatically. The determination of the mass of the respective payload becomes even more precise as a result of this.

Calibration data for different height positions of the loading tool are generated during a calibration process, for example, for a base region of the payload stock and for a peak region of the payload stock which is opposite in terms of height. From this, calibration data for a plurality of height positions lying therebetween can be generated in a technically simple manner by interpolation so that an entire characteristic diagram can be generated and provided as calibration data for this payload stock with a low degree of calibration outlay.

The respective height position of the loading tool is detected by a sensor means or mechanism. A suitable position sensor is arranged on the lifting device or the loading tool or the machine itself.

The loading tool is guided during its operating mode consecutively to different payload stocks for receiving various payloads. The payload stocks can be different in terms of their specific density or materials or other features. Here, at least one loading process can be carried out by means of the loading tool at each payload stock. This sequence-like operating mode can advantageously be used to economically realize a predefined mixture of different payloads. In particular, precise metering of a food mixture as animal food can be achieved.

In a further embodiment, the loading tool is guided in a predetermined sequence to various payload stocks. As a result of the predetermined sequence, the quality of the mixture can be improved since the result of the mixing process (e.g., in a mixing vehicle or mixing container) is influenced by the relative arrangement of the different payloads to one another. For example, it is advantageous in the case of a food mixture to unload components with a lower density to the operating location for the production of the mixture before components with a higher density are unloaded.

Insofar as the machine has a vehicle position detection system (e.g., GPS), this can support the production of a predefined payload mixture. For example, a control unit can process the predefined mixture data and as a function of this maneuver the machine autonomously consecutively into the correct payload stock. Alternatively, the control unit can generate warning signals to the driver if he or she does not drive the machine to the correct payload stock or does not drive to the payload stocks in the correct sequence.

A system is provided with a suitable control means or mechanism to carry out the method. These control means or mechanism comprises a control unit which processes different signals and controls operating functions of the machine as a function of the signal processing. This control can relate, for example, to the movement control of the loading tool or the lifting device during or outside a loading process. The machine itself, in particular its propulsion, can be controlled by this control unit in order to support the carrying out of the method. The control mechanism or the control unit process in particular signals from at least one of the following signal sources: the aforementioned sensor mechanism, position sensors, control signals or data inputs by the user or driver, calibration data, vehicle position detection system, data or control bus of the machine.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
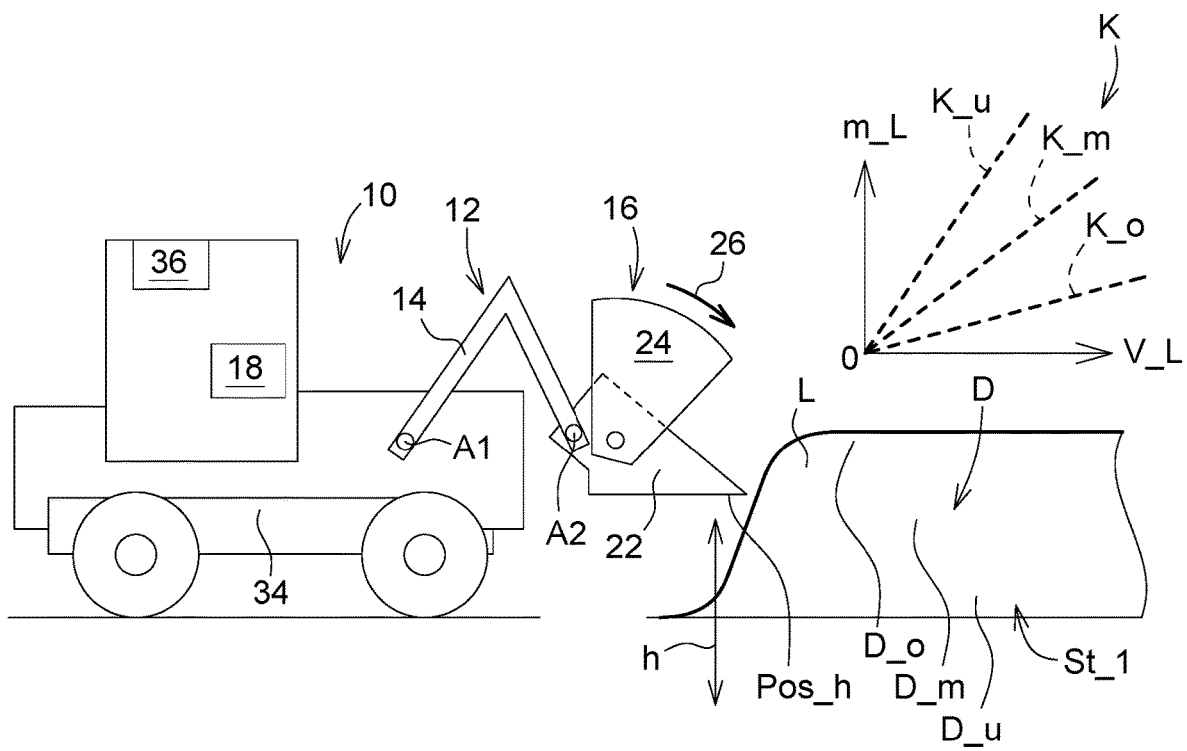
FIG. 1 shows a schematic side view of a machine with a loading tool for the operating mode at at least one payload stock.

FIG. 1 schematically shows a machine 10 with a lifting device 12 arranged thereon in the form of a front loader. Lifting device 12 is mounted in an articulated manner on machine 10. It has a cantilever 14 which is mounted pivotally about a first pivot axis A1 relative to machine 10. A loading tool 16 is mounted pivotally about a second pivot axis A2 relative to cantilever 14.

By means of an electronic control unit 18 integrated in machine 10, corresponding control signals as a result of an automatic algorithm or individual signal inputs by a user or operator of the machine, lifting device 12, in particular its cantilevers 14 and loading tool 16, can be actuated in terms of movement. For this purpose, the lifting device 12 is coupled to suitable actuators (e.g., hydraulic lifting cylinders).

Loading tool 16 is formed as what is known as a grapple bucket 20 which has a bucket receiver 22 and a pivotable bucket shutter 24 which interacts with it. In order to receive a payload L with mass m_L by loading tool 16, bucket receiver 22 is guided towards a payload stock St_1 (e.g., filled with silage or animal food). As soon as a receivable mass m_L has been detected as corresponding with sufficient precision to a predefined target mass m_target, a pivoting or folding down of bucket shutter 24 in a closing direction 26 is triggered and mass m_L is actually received. This can be carried out e.g., automatically by a control unit 18 or individually by the user or operator of machine 10. In the case of this loading process, bucket shutter 24 separates payload L to be received from the rest of payload stock St_1 in an accurate manner so that the latter is not unnecessarily impaired. At the same time, mass m_L of received payload L has been determined with sufficient precision so that, after this loading process, no part residual mass of payload L has to be poured back onto payload stock St_1. As a result of this, in particular in the case of animal food, any reductions in quality of payload stock St_1 are avoided.

Along a height direction h, payload stock St_1 often has a density gradient as a result of the material properties of payload L (e.g., in the case of silage, animal food). For example, in a lower base region in terms of height, a specific material density D_u is greater than density D_o in a higher peak region in terms of height. In terms of height, there can exist therebetween further different density values, e.g., a density D_m, wherein D_u>D_m>D_o. In a calibration process prior to the actual operating mode of loading tool 16, at least one material density D is determined, for example, both densities D_u and D_o. Characteristic curves K, i.e., K_u and K_o, can be generated from this and provided for the subsequent operating mode. With the calibration process, any desired number of further densities D or calibration data or characteristic curves K can be generated directly or by interpolation along the height direction, for example, density D_m or characteristic curve K_m.

The above-mentioned material density D is particularly suitable as calibration data for a determination of considered mass m_L of payload L since, as a result of this, only a volume V_L of the payload L may be detected. Mass m_L can then easily be determined as a function of detected volume V_L and the associated calibration data.

During the operating mode, respective height position Pos_h of loading tool 16 is detected in order to determine relevant material density D or relevant characteristic curve K. As a result of this, respectively considered mass m_L within a payload stock with density gradients can be determined particularly precisely.

Control of loading tool 16 during the operating mode is carried out by control unit 18 cited above. The latter forms a control means or mechanism, or is a component of the control means or mechanism, which, jointly with the sensor means or mechanism and, where applicable, further structural units, form a system 28 for carrying out the control method.

Figure 2:
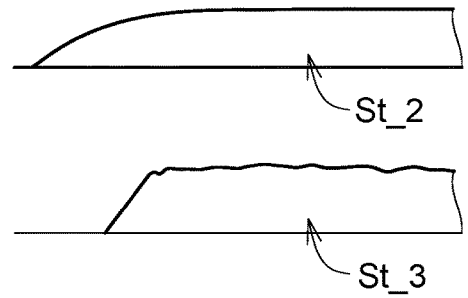
FIG. 2 shows a block diagram with a control mechanism for carrying out the control method.
Figure 2:
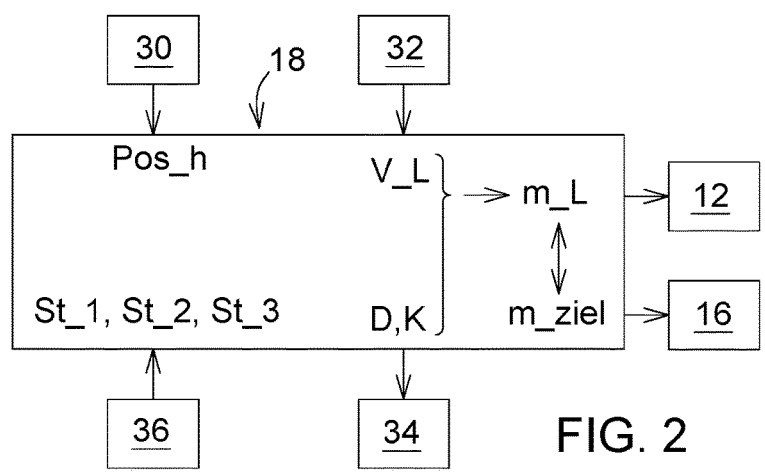

Such a system 28 is represented by way of example and schematically in FIG. 2. In further embodiments, system 28 can be supplemented by further components, not represented here.

A position sensor 30 arranged on machine 10 or lifting device 12 detects height position Pos_h of loading tool 16. Sensor means or mechanism 32 (e.g., two cameras or two distance sensors) detect volume V_L of payload L considered for the intended receiving. Mass m_L of the considered payload is determined by relevant characteristic curve K depending on height position Pos_h. Mass m_L determined in each case is compared with target mass m_target. This comparison is repeated in the framework of an algorithm until the comparative result produces a sufficiently precise match by mathematical definition, in particular taking into account a defined tolerance mass, between determined mass m_L and predetermined target mass m_target. The mass m_L is then received by loading tool 16 in the course of this loading process. The working operation can also be further supported by virtue of the fact that control unit 18 interrupts a drivetrain 34 of machine 10 as soon as the above-mentioned comparative result indicates that target mass m_target is achieved with sufficient precision. As a result of this, a signal is given to the user or driver that payload L can be received in this reached position of loading tool 16.

During its operating mode, loading tool 16 can be guided consecutively onto different payload stocks (e.g., payload stocks St_1, St_2 and St_3) in order to receive different payloads L. The adherence to a specific sequence can also be important, for example, in order to assemble a mixture as animal food from different silage payloads in as optimum a manner as possible. Guiding machine 10 onto different payload stocks in a specific sequence can be supported by a position detection system 36 (e.g., GPS) of machine 10.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:
1. A method for controlling a loading tool, comprising:
   operating the loading tool on a lifting device of a machine, the loading tool including a bucket receiver and a bucket shutter;

detecting via a first sensor a height position of the loading tool relative to a base level of a payload stock;
detecting via a second sensor a volume of a payload from the payload stock during an operating mode;
receiving the payload by the loading tool from the payload stock during the operating mode;
accessing via a control unit calibration data representative of a ratio between a volume of the payload and a mass of the payload;
determining via the control unit the mass of the payload as a function of the detected volume and the calibration data;
comparing via the control unit the mass of the payload to a predetermined target mass; and
automatically closing via the control unit the bucket shutter when the mass of the payload matches the predetermined target mass.

2. The method of claim 1, further comprising controlling an operating function of the loading tool as a function of the comparing step.

3. The method of claim 1, further comprising interrupting via the control unit a propulsion of the machine as a function of the comparing step to prevent the machine from driving further into the payload stock.

4. The method of claim 3, wherein the receiving step is initiated after the control unit interrupts the propulsion of the machine.

5. The method of claim 1, further comprising providing calibration data for various height positions of the loading tool.

6. The method of claim 1, further comprising guiding the loading tool during the operating mode consecutively to different payload stocks for receiving various payloads.

7. The method of claim 6, wherein the various payloads are formed as a component of a feed mixture.

8. The method of claim 6, further comprising guiding the loading tool during the operating mode in a predetermined sequence to various payload stocks.

9. A control system of an agricultural machine, comprising:
an electronic control unit for controlling a function of the machine;
a loading tool for receiving a payload from a payload stock, the loading tool movably coupled to the machine, the loading tool including a bucket receiver and a bucket shutter;
a first sensor disposed in communication with the electronic control unit, the first sensor configured to detect a height of the loading tool;
a second sensor disposed in communication with the electronic control unit, the second sensor configured to detect a volume of a payload to be received by the loading tool; and
predetermined calibration data stored in the electronic control unit, the calibration data defined as a ratio between a volume of the payload and a mass of the payload;
wherein, during an operating mode, the first sensor detects the height of the loading tool, the second sensor detects the volume of the payload, and the electronic control unit determines the mass of the payload as a function of the detected volume and the calibration data; and
wherein, during the operating mode, the electronic control compares the mass of the payload to a predetermined target mass, and the electronic control automatically closes the bucket shutter when the mass of the payload matches the predetermined target mass.

10. The control system of claim 9, wherein:
the first sensor comprises a position sensor; and
the second sensor comprises at least one camera or one distance sensor.

11. The control system of claim 9, wherein the electronic control unit operably interrupts an operation of a powertrain of the machine as a function of comparing the mass of the payload to the predetermined target mass to prevent the machine from driving further into the payload stock.

12. The control system of claim 9, wherein the electronic control unit operably guides the loading tool consecutively onto two or more payload stocks for receiving different payloads.

13. The control system of claim 12, wherein the electronic control unit operably guides the loading tool in accordance with a specific sequence based on a communication from a position detection system.

14. A method for controlling a loading tool, comprising:
operating the loading tool on a lifting device of a machine, the loading tool including a bucket receiver and a bucket shutter;
detecting via a first sensor a height position of the loading tool relative to a base level of a payload stock;
detecting via a second sensor a volume of a payload from the payload stock during an operating mode;
receiving the payload by the loading tool from the payload stock during the operating mode;
accessing via a control unit calibration data representative of a ratio between a volume of the payload and a mass of the payload;
determining via the control unit the mass of the payload as a function of the detected volume and the calibration data;
comparing via the control unit the mass of the payload to a predetermined target mass; and
interrupting via the control unit a propulsion of the machine as a function of the comparing step to prevent the machine from driving further into the payload stock.

15. The method of claim 14, wherein the receiving step is initiated after the control unit interrupts the propulsion of the machine.

16. The method of claim 14, further comprising controlling an operating function of the loading tool as a function of the comparing step.

17. The method of claim 14, further comprising providing calibration data for various height positions of the loading tool.

18. The method of claim 14, further comprising guiding the loading tool during the operating mode consecutively to different payload stocks for receiving various payloads.

19. The method of claim 18, wherein the various payloads are formed as a component of a feed mixture.

20. The method of claim 18, further comprising guiding the loading tool during the operating mode in a predetermined sequence to various payload stocks.

* * * * *